(12) United States Patent
Lin et al.

(10) Patent No.: US 6,912,301 B1
(45) Date of Patent: Jun. 28, 2005

(54) DIGITAL AMBLYOPIA IMAGE AID SYSTEM PROVIDED WITH INDIVIDUALLY ADJUSTABLE FUNCTION

(75) Inventors: Chii-Wann Lin, Taipei (TW); Hsin-Chih Lin, Banchiau (TW); Tzu-Chien Hsiao, Taipei (TW)

(73) Assignee: National Taiwan University (TW)

( * ) Notice: Subject to any disclaimer, the term of this patent is extended or adjusted under 35 U.S.C. 154(b) by 763 days.

(21) Appl. No.: 09/989,427

(22) Filed: Nov. 21, 2001

(51) Int. Cl.[7] .............................................. G06K 9/00
(52) U.S. Cl. ..................................... 382/128; 382/266
(58) Field of Search ............................... 382/128–134, 382/254, 255, 263, 266; 358/3.27, 447; 351/44, 47, 200–203, 208, 211, 212, 223; 600/318, 356; 359/600

(56) References Cited

U.S. PATENT DOCUMENTS

| | | | | |
|---|---|---|---|---|
| 5,206,671 A | * | 4/1993 | Eydelman et al. | 351/203 |
| 5,264,877 A | * | 11/1993 | Hussey | 351/45 |
| 5,579,161 A | * | 11/1996 | Sekiguchi | 359/559 |
| 6,467,906 B1 | * | 10/2002 | Alpins | 351/212 |
| 6,511,175 B2 | * | 1/2003 | Hay et al. | 351/45 |

* cited by examiner

*Primary Examiner*—Kanjibhai Patel
*Assistant Examiner*—Abolfazi Tabatabai
(74) *Attorney, Agent, or Firm*—Michael Bednarek; Pillsbury Winthrop Shaw Pittman LLP

(57) ABSTRACT

A digital amblyopia image aid system provided with individually adjustable function, the structure thereof at least consists of an original image input, a system processing center and an image output after adjusting, wherein the characteristics is the said system processing center can adjust on vision according to individual amblyopia patient, and simulate the image seen by the vision disabled through linear and non-linear method to determine and adjust the suitable image contrast intensification parameters according to users' image intensification effect requirement to enhance the image contrast information and provide optimal image effect, and the said system can be applied in electronic magnification system, added with internet function, making it become class instruction reading system for the vision disabled, while the digital signal processor (DSP) is used for outdoors and convenience increasing, which adds exclusive image contrast intensification function into portable aid to bring more convenience and practicability for the vision disabled.

21 Claims, 19 Drawing Sheets

DIGITAL AMBLYOPIA IMAGE AID SYSTEM PROVIDED WITH INDIVIDUALLY ADJUSTABLE FUNCTION

BACKGROUND OF THE INVENTION

The invention relates to a digital amblyopia image aid system provided with individually adjustable function, more specifically, it relates to the image contrast intensification parameters which can be adjusted by the vision disabled to be suitable for oneself according to the vision degradation degree, to enhance the image contrast information and provide with optimal image effect. The said system can be applied in electronic magnification system, added with internee function, making it become the class instruction reading system for the vision disabled, while the digital signal processor (DSP) is used for outdoors and increasing the convenience, which adds exclusive image contrast intensification function into portable aid to bring more convenience and practicability for the vision disabled.

Most people perceive via sensory organs and communicate with people around them, which makes significant influence on our daily life function. In comparison with the sense of touch, taste and smell, we heavily rely on the function of the sense of sight and hearing much in most function of our daily life. Our sensory function provides with acquired adaptive capability can compensate the minor loss of certain sensation. In general, if one of the both functions is lost, the other one will automatically enhance the function thereof to supply the lost part. While the both are damaged to lose their function, the other remained sense function might be able to use for minor help. When one who unfortunately lose his sensory function, especially the sense of sight and hearing, may result in reducing of life function and quality, particularly in the aspect of communication and message delivery between people, sports capability, works, entertainment, etc. The cause resulting in sensory function losing may originate from congenital diseases, acquired diseases or accidents, etc. Particularly for Taiwan, the society of which steps toward industrialized age, the convenient, effective and cheap rehabilitative aid will become the major factor for increasing production power, activity power and life quality of these people. Thus it is especially important, nowadays, the computer science is getting popular, thus the function of disability aid is gradually toward high-tech application to assist user to recover the proper function on message delivery, exercise, and works safely. Though the object of natural application is to reduce cost through mass production, the aid design should keep in mind the personal usage. Thus the design of a disabled aid should consider individual medical history to make it better, which includes age, type, and degree of sensory lost, and sometimes more important for educated culture experiences.

The definition of vision impairment is based on acuity and field. The acuity of normal humans is typically from 20/20~20/40, and the field is between about 160~180 degrees levelly and 120 degrees vertically. If the measured region is proved to be lower than above values, it can be identified as vision impairment. Legally blind is the one whose acuity is lower than 20/200 or field is smaller than 20 degrees levelly after correction. In general, one who is defined as blindness may still be with slight acuity. But whether the residual acuity can be used or not depends on type of vision impairment and occurrence age. However, in quite a few cases, it can be improved through the method of proper illumination condition and glare reduction, etc.

There can be useful vision between totally blind and legally blind. Thus, "low vision" (amblyopia) is the term for one whose visual function is incomplete, but is better than totally blind, according to the definition. Since that how everybody uses vision aid to increase the effect of one's residual vision is related much with the vision impairment condition. For example, occurrence age: vision impairment happened during variant age results in difference in learning ability, thinking mode, concrete and abstract object, skill, concept, etc. The pathological changes of visual field might result from disease, such as macular degeneration induced central field lose will affect the reading ability, whereas the retinitis pigmentosa induced perimeter view loss will have effects on the exercise ability.

Thus, how to effectively apply engineering techniques to design and fabricate aids, which meets the individual situation, thereby increase the effect of residual vision, is a considerable challenge. Therefore, the endeavors in various levels of physiology, pathology, psychology and society must integrate to make better contribution for the engineering efforts Most of the aids use tactile sense or voice to promote the life function of the vision disabled. While the definition of vision impairment includes different degree of low-vision and blind, large portion belongs to low-vision condition. It is generally believed that if better visual stimulus can be provided during early stage, then it might be of great helps for the progress of rehabilitation no matter for the young or old.

The present developed aid system for vision impairment focuses mainly on the function of magnification and view in far distance, which can be achieved with two technologies: optical aids and electronic magnifier. The present development of above two technologies will be described below:

Optical aids: mainly consist of optical system, including special glasses, hand or stand magnifier or telescope system. Most of the system focuses on reading assistance, so the major consideration for design is proper and comfortable reading distance, position and coverage of view. While under the requirement of high magnification, it can only achieve by shorting the distance between objects and lens. However, due to the inverse relation between viewing field and magnification factor, this will also reduce the visual field, which usually results in certain degrees of inconvenience for the user, including inconvenience resulting from body-position adjustment (stooping), insufficient illumination, uncomfortable vision, etc. The same case also exists while using computer screen. Therefore, how to effectively provide full view of learning documents and increase the efficacy of reading speed are extremely important research topics. Thus in some system, controllable scanning platform is utilized, some others use glasses to achieve magnification, far view effect. However, under high magnification factor, the user will feel dizzy, sick (resulting from asymmetry between vestibule system and vision), which commonly exists in magnifier application. Glass-type telescope application generally is suitable for static user (reading or watching TV) and the design of bi-focal lens must be used in motion. While viewing a distant place, the telescope part of the lens must be in the far position. Furthermore, there is auto-focus-changing application at present. The important consideration for the user is on the weight, which is expected to progress with material and electronics technology. As to the improvement and control for illumination, there is battery driven head-illuminating equipment used for improving aforementioned disadvantage while being used in high magnification.

Electronic magnifier and image enhancement: to overcome the problem of high magnification optically, there are a large amount of reading system at present, which use CCTVs to enhance the reading ability of the low-vision. The desktop system mainly consists of video camera, illuminating system and screen, the magnification of which generally can achieve about 50 times. The read papers are put on the x-y dual-axis scanning platform, such that the video camera can easily scan. For most of the system, the required contrast can be adjusted at user's swill to reduce glare, and the scattering problem can also be solved through high-light to be fitted for retinitis pigmentosa, etc. older patient. At present, there are quite a few hand-held electronic magnifier systems being supplied for selection, but which is generally with lower magnification, and even must be used by matching with rehabilitative education to bring the effect into full play. In the present development of visual reality, there is visor or goggle mounted display (CMD) used to substitute for display screen, though the price of which is more expensive and fail to be available to all, it is still with quite a little developing potential. Besides the above striving direction, the vision scientists also try to understand more about the vision system for applying in new generation system design, making the system adjustment not just be limited in magnification and contrast adjustment, which comprise the new development in complicated function parameters adjustment for fitting the vision characteristics of individual vision disabled person and image remapping for fitting the residual view, etc. Briefly, the major object for present low-vision technology aids is effectively using the improvement of contrast and the adjustment of illumination condition, though above described problem can be improved through using the two methods, but the problem about adjustable capability is still waiting until further breaking through.

In view of several above disadvantages about optical aids and electronic magnifier, the inventor devotes in research for improving the imperfection, and bases on the accumulated experiences from engaging in the industry for many years, further develops a digital amblyopia image aid system provided with individually adjustable function, which especially refers to one which can adjust on vision according to individual amblyopia patient, and simulate the image seen by the vision disabled through linear and non-linear method to decide image contrast intensification parameters, and adjust image contrast intensification parameters suitable for the user per se according to user's image intensification effect requirement, which can enhance the contrast information of image and provide optimal image effect, and the said system can be applied in electronic magnification system, added with internet function, making it become the class instruction reading system for the vision disabled, while the digital signal processor (DSP) is used for outdoors and convenience increasing, which adds exclusive image contrast intensification function into portable aid to bring more convenience and practicability for the vision disabled.

SUMMARY OF THE INVENTION

The major object of the invention is to design a digital amblyopia image aid system provided with individually adjustable function, more specifically, it relates to the image contrast intensification parameters which can be adjusted by the vision disabled to be suitable for himself according to the vision degradation degree, to enhance the contrast information of image and provide optimal image effect. The said system can be applied in electronic magnification system, added with internet function, making it become the class instruction reading system for the vision disabled, while the digital signal processor (DSP) is used for outdoors and convenience increasing, which adds exclusive image contrast intensification function into portable auxiliary to bring more convenience and practicability for the vision disabled.

To achieve above object, the invention is realized in the following mode: a digital amblyopia image aid system provided with individually adjustable function. The said system structure consists of an original image input, a system processing center and an image output, which is after adjusting. The characteristics of the said system_is that the processing center can adjust on vision according to individual amblyopia patient, simulate the image seen by the vision disabled through linear and non-linear method for image contrast intensification parameters—decision, and adjust image contrast intensification parameters suitable for the user per se according to user's image intensification effect requirement, which can enhance the contrast information of image and provide optimal image effect. The said system can be also applied in electronic magnification system, and added with internet function. Therefore, the said system becomes the class instruction reading system for the vision disabled. In order to use for outdoors and convenience, the digital signal processor (DSP) is used for adding exclusive image contrast intensification function into portable aid to bring more convenience and practicability for the vision disabled.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

To make the examiner understand more about the object-, characteristics, and effect of the invention, the invention will be described in detail through following embodiment and accompanied drawings as follows:

The invention will focus on the fitted image enhancement process for the residual vision of the vision disabled. Hence the image contrast intensification parameter for each user can be determined according to both the vision degradation degree and the resolved image. The parameter can be used to express the intensification degree for the high frequency information contrast value in image information, such that the image information resolving capability for the user can be enhanced.

Figure 1:
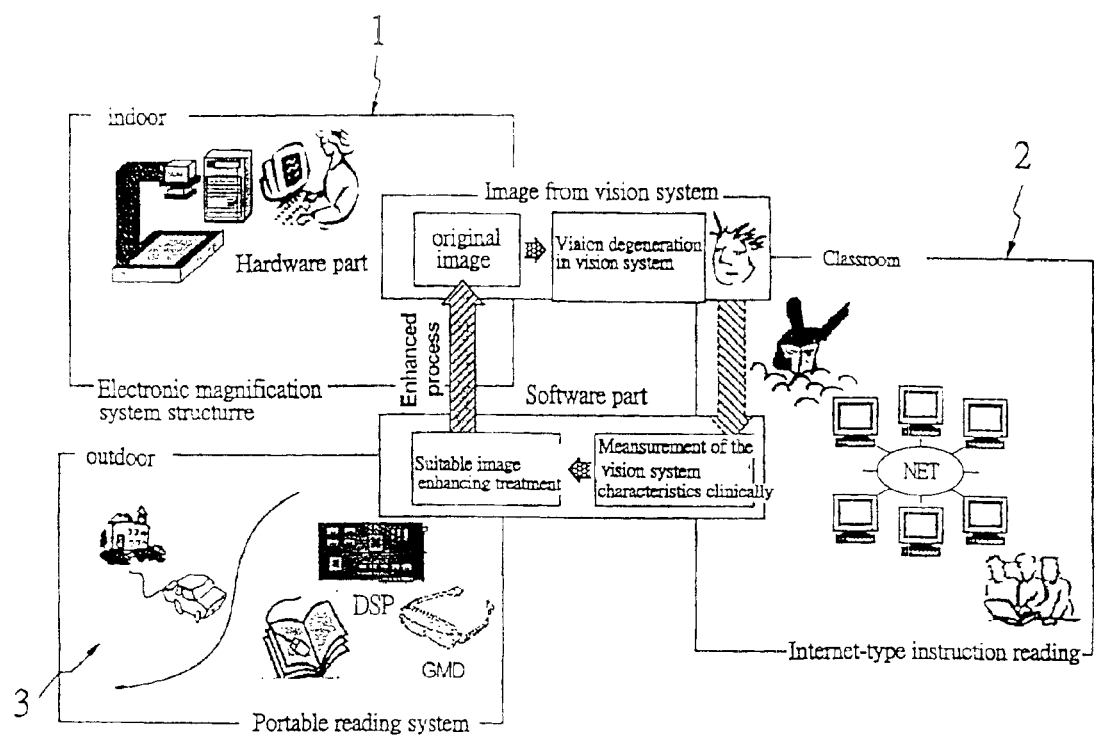
FIG. 1 is the whole structure diagram of the invention.

Please refer to FIG. 1, which is the whole structure system diagram of the invention. As shown in the figure, the said electronic reading auxiliary system can be respectively applied in electronic magnification system structure 1, internet-type instruction reading system 2 and portable reading system 3.

Figure 2:
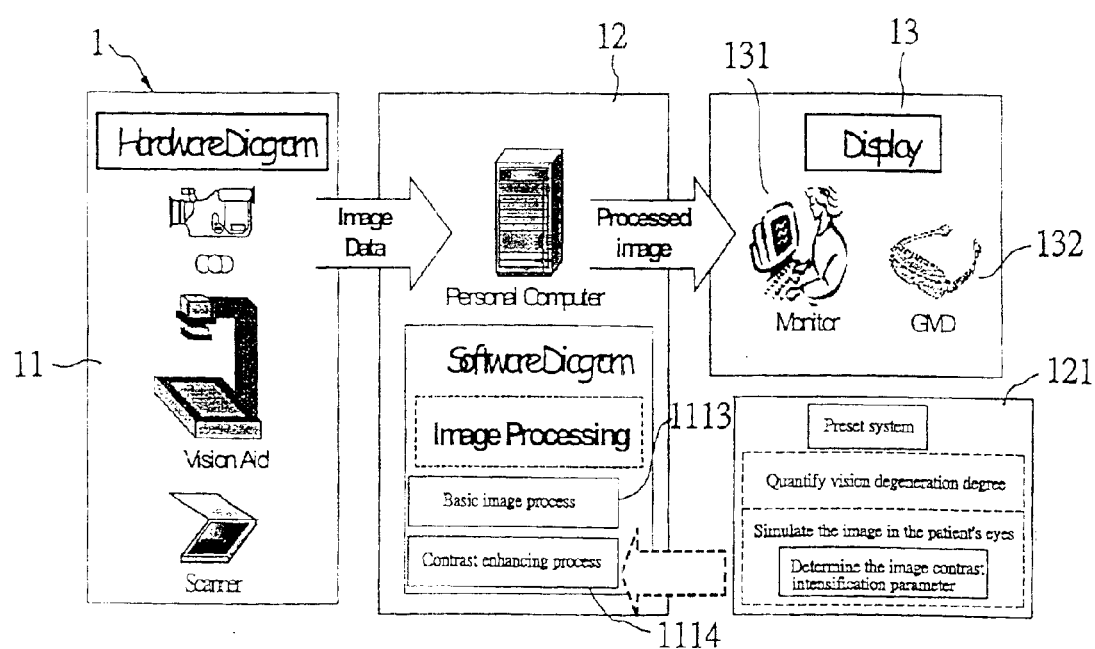
FIG. 2 is the electronic magnification system real diagram of the invention.

FIG. 2 is the said electronic magnification system structure 1, which is divided into hardware part 11 and PC processed software part 12. The major system function for hardware part 11 is to receive external image information, such that we will design the hardware structure vision aid for considering the reading of the vision disabled. By mating with the exclusive image processing software part 12, the system can enhance the image information identification capability for vision disabled person. By matching with the monitor 13 of the computer (PC) 131 or GMD 132, etc. for image display, the said system can serve for the reading of the vision disabled.

Figure 3:
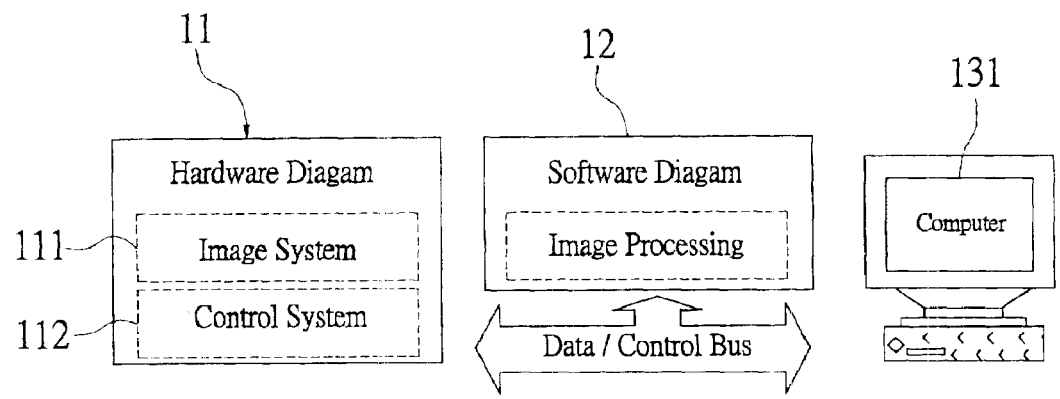
FIG. 3 is the electronic magnification system structure diagram of the invention.

Therefore, the development point in electronic magnification system 1 focuses on supplying for the reading of the vision disabled. FIG. 3 is the electronic magnification system structure diagram of the invention, wherein the structure is divided into two parts of hardware 11 and software 12. The hardware part 11 mainly can control reading platform and receive external image instantly, and transfer the image information to the software part 12 for image processing to make proper image enhancement. Hence, it can result in the image information which makes the vision disabled and the aged read books and identify more easily.

The hardware part 11 consists of image system 111 and control system 112. And it also connects with PC 131, for controlling programmable to obtain image information for rear end software processing.

The said image system 111 get the image magnified and captured by high magnification camera 1111. After the image is transferred into digital signal by the image acquisition card, the user can do the image processing 1112 of image information via PC 13 (the flow chart of image system 111 is shown as FIG. 4). The primary magnification of CCD camera lens 1111 and the maximum magnification of the entire system can be calculated by following formula: primary magnification: 0.84~0.084×.

$$\text{system\_magnifaction} = \text{primary\_magnification} \times \frac{\text{monitor\_size}}{\text{CCD\_size}}$$

For example, if the monitor size for image display and the sensor size are 17 inches and 6 mm respectively, the maximum magnification can be calculated by the above formula is 60×, meeting the magnification requirement of the magnification system.

Figure 5:
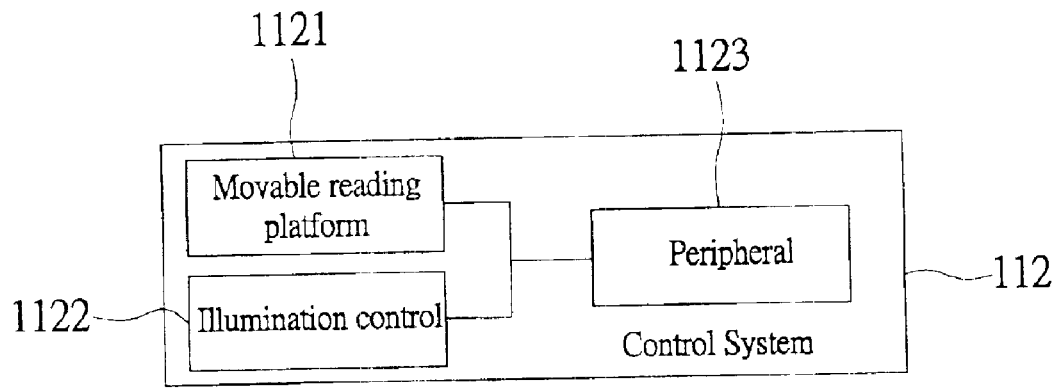
FIG. 5 is the control system structure diagram of the electronic magnification system.

In order to make the operation environment better for the user, the said control system 112 utilizes motor-driven movable platform as user's reading platform 1121 and matches with proper illumination control 1122 to be convenient for the use and read of the user (the flow chart of the control system 112 is show as FIG. 5). To allow the user to read books easily, the said movable reading platform 1121 adopts the reading platform which is a motor-driven X-Y axis movable platform, which allows the user to move book properly according to one's reading speed. And the series port of PC 131 can be used to output control signal achieving the control function for the platform. To allow the user to operate the reading platform easily, a program is developed to directly catch the direction key, which allows the user to control the reading platform 1123 directly with the direction key on the keyboard of the peripheral system 1123, such that the operation procedure for the reading platform 1121 can be reduced. The illumination control 1122 mainly is high frequency stable white light. It can be matched with filter lens to achieve the most suitable illumination condition, be comprised the application of polarized illumination source.

Figure 6:
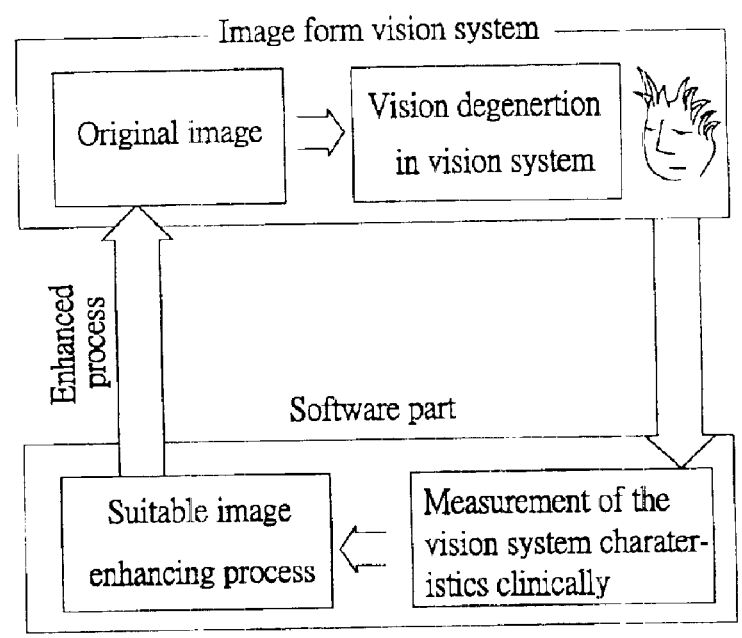
FIG. 6 is the software part structure diagram of the electronic magnification system.
Figure 7:
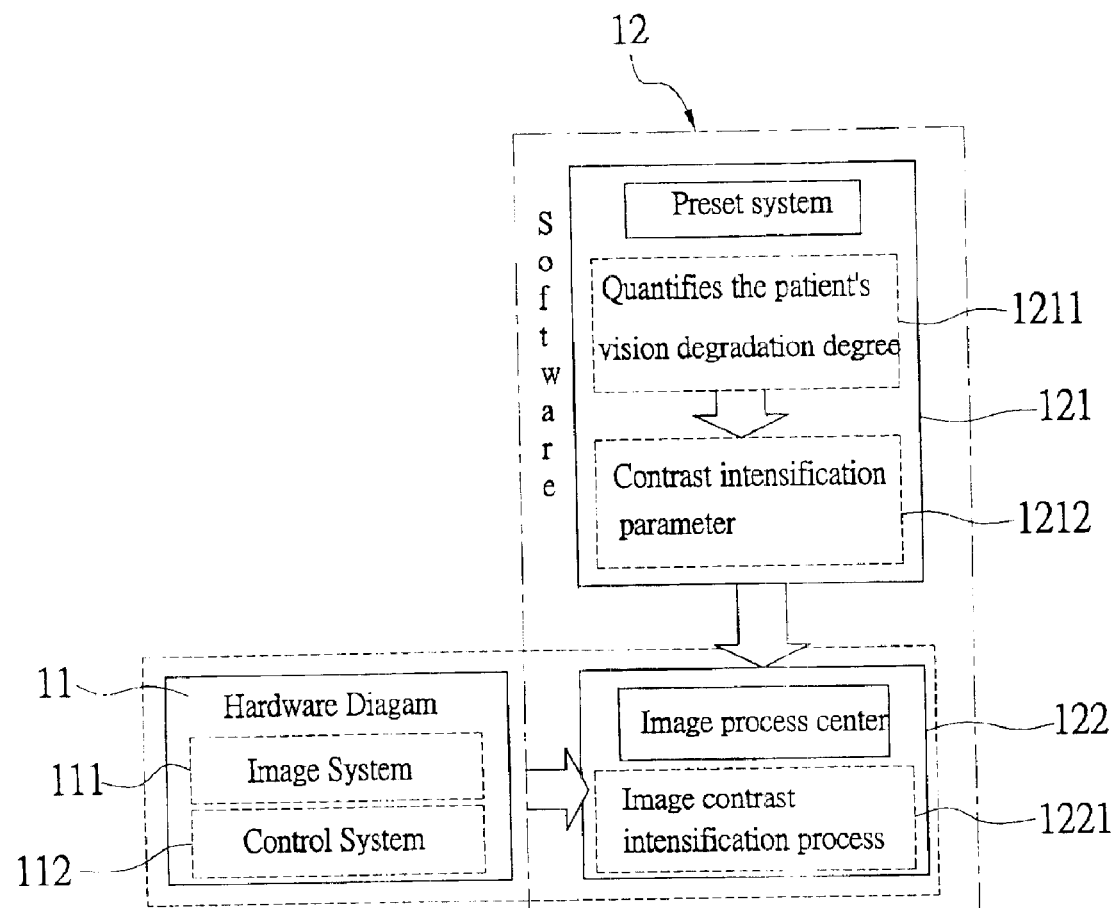
FIG. 7 is the detailed software part structure diagram of the electronic magnification system.
Figure 8:
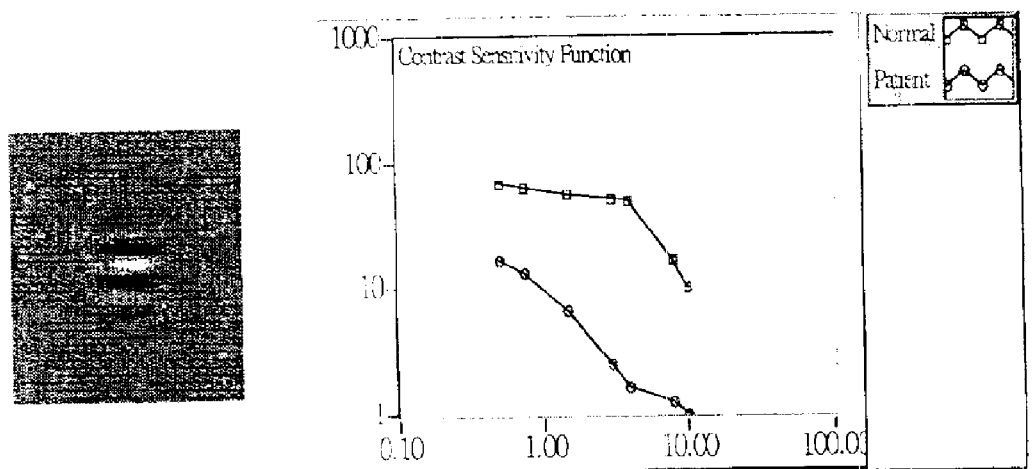
FIG. 8 is the grating diagram of the measured vision CSF of the electronic magnification system and the measurement result chart thereof.

As for software part 12, the image information seen by human beings is actually not the original image information. Because of the difference in the vision characteristics for everybody, the seen image information should be different. Especially for the vision disabled patients, the vision disease resulted vision degradation and their capability in receiving external information has been reduced. As the increase in age, the vision of the vision disabled and the aged will gradually lose the sensitivity for high frequency image information, resulting that they can only see the closer object and increase the hardness in reading for the patient. If proper image processing and image contrast information enhancement can be made previously according to the vision degradation degree of the patient, the patient can more easily read books and identify the picture in the books. Therefore, in the electronic magnification system 1, we utilize measurement of the vision system characteristics of the vision disabled person clinically and base on the vision degradation degree for each patient, to determine the image contrast intensification parameter (image intensification degree) via simulating the image which can be resolved by the vision system, providing the parameter for suitable image enhancement processing to intensify the contrast information of the high frequency part of the image. The enhanced image can be used to enhance the vision identification capability of the vision-disabled person (FIG. 6). Therefore, the software part 12 is divided into two units of preset system 121 and image processing center 122 (FIG. 7), the preset system 121 mainly quantifies the patient's vision degradation degree 1211 previously, and determines the image contrast intensification parameter via the simulated image in patient's eyes. Then the contrast intensification parameter 1212 is implanted into the image processing kernel 122, such that the image captured by the hardware part 11 can immediately be through image contrast intensification process 1221 by the image processing kernel 122 to enhance the contrast intensity of the boundary part of the image. In the preset system 121, the contrast intensification parameter 1212 can be provided to the image process center 122. Consequently, the function of the preset system 121 should qualify the vision degradation degree 1211 of the patient. As well, based on the vision degradation degree 1211 for simulating the image seen by the patient in advance, the image process center 122 enhances the image after boundary contrast intensity, and then through the simulation for the image seen by the patient to get the optimal intensification parameter 1221. The quantified vision degradation degree 1211 can be regarded as summation of the space filter characteristics with various bandwidths in human vision system. The minimum exciting intensity for the vision with regard to the space frequency can be measured through the drawing of the product of sine grating and Gaussian function, the inverse of which is the sensitivity for the unit pulse stimulation. The contrast sensitivity under much space frequency can be generally called contrast sensitivity function (CSF), we can know the vision degradation situation under the stimulation of unit pulse of different space frequency based on the patient's CSF (FIG. 8 is the actual measurement result). Furthermore, the simulated image seen by the patient is based on the CSF of the vision system measured from sine grating drawing, the CSF value can be used to indirectly transfer and simulate the image seen by the patient, and the simulation method can be divided into the way of linear and non-linear, both of the simulation method can be used to simulate individually for the cataract patient and macular degeneration patient.

As for the part of image contrast intensification parameter 1212 decision, which utilizes the correlation coefficient between the simulated image seen by the patient and the image before simulation, and the correlation coefficient between the intensified image and the image before intensification. As the correlation coefficient value is calculated, it can be search for an optimum image contrast intensification parameter value 1221.

Figure 9:
FIG. 9 is the original picture and the linear simulated picture seen by the retinitis pigmentosa patient.

The said linear simulation method: the ratio of patient's CSF to ordinary person's CSF is the normalized CSF (NCSF), and the linear simulation method can be regarded as the transfer function of the optical characteristics of the retinitis pigmentosa patient's crystalline lens. That means that the NCSF can be used to simulate the characteristics of the patient's image filter, thereby the image information seen by the retinitis pigmentosa patient can be. simulated by the NCSF. The simulation result is shown as FIG. 9.

The said non-linear simulation method is used to simulate the image seen by the macular degeneration patient. The macular degeneration is the spot in the retina center, which is named as macular, suffers from injuring and destroying, therefore the vision loses its resolution for high frequency component in the image, resulting in blurred image center. Although the image in the other region of the retina is still clear, the macular degeneration patients have the problem in reading or seeing near object.

The human vision system can be regarded as the summation of filters with numerous different frequency bands, thus the image can be divided by using passband filters with different center frequency, and the image contrast of different frequency bands can be calculated individually. By combining with the contrast stimulation intensity which is measured from the unit pulse stimulating under various space frequency for the patient, the image seen by the patient under various space frequency can be simulated. Finally, by adding the image various space frequency together, the image seen by the patient can be simulated, as shown as FIG. 10. The linear and non-linear simulation methods can simulate individually the image seen by the retinitis pigmentosa patient and the macular degeneration patient respectively. We add the image after image contrast intensifying into the linear or non-linear simulation methods for calculating the optimum image contrast intensification parameter 1221.

Figure 10:
FIG. 10 is the original picture and the non-linear simulated picture seen by the retinitis pigmentosa patient.
Figure 11:
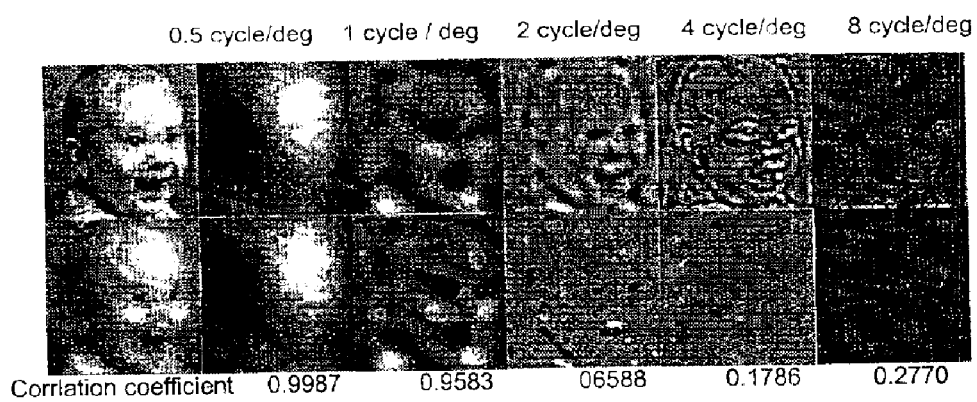
FIG. 11, the upper row images are the un-intensified original images, and the lower row images are the simulated image seen by the patient, and the up-left image is the original one, and from which toward right side are sequentially the image filtered by the passband filter with central frequency of 0.5 cycle/deg, 1 cycle/deg, 2 cycle/deg, 4 cycle/deg and 8 cycle/deg, and the correlation coefficient between the upper and lower raw images done individually under various space frequency.

The image contrast intensification parameter 1221 is determined. Based on the simulated vision image of patient's vision, the passband filter with various center frequency can be used to divide the image information with various frequency of the image. As well the correlation coefficient is used for making similar contrast measurement between the image included in various frequencies after and before simulation. The correlation coefficient is calculated as follows:

$$r = \frac{\sum_{m}\sum_{n}(A_{mn} - \overline{A})(B_{mn} - \overline{B})}{\sqrt{\left(\sum_{m}\sum_{n}(A_{mn} - \overline{A})^2\left(\sum_{m}\sum_{n}(B_{mn} - \overline{B})^2\right)\right)}}$$

where A=mean(A),B=mean(B) . In FIG. 10, we can know that the image seen by the patient is far from ideal, even cannot be identified. If proper image contrast intensification can be made, the image quality supplied to the patients will be better.

The image contrast intensification parameter 1221 adjustment can be used, repeatedly for calculating the correlation coefficient between the image after and before simulation and the image after and before intensification. It also can be quantified the result of which into figure. The figure can be used for determining the image contrast intensification parameter 1221.

Figure 12:
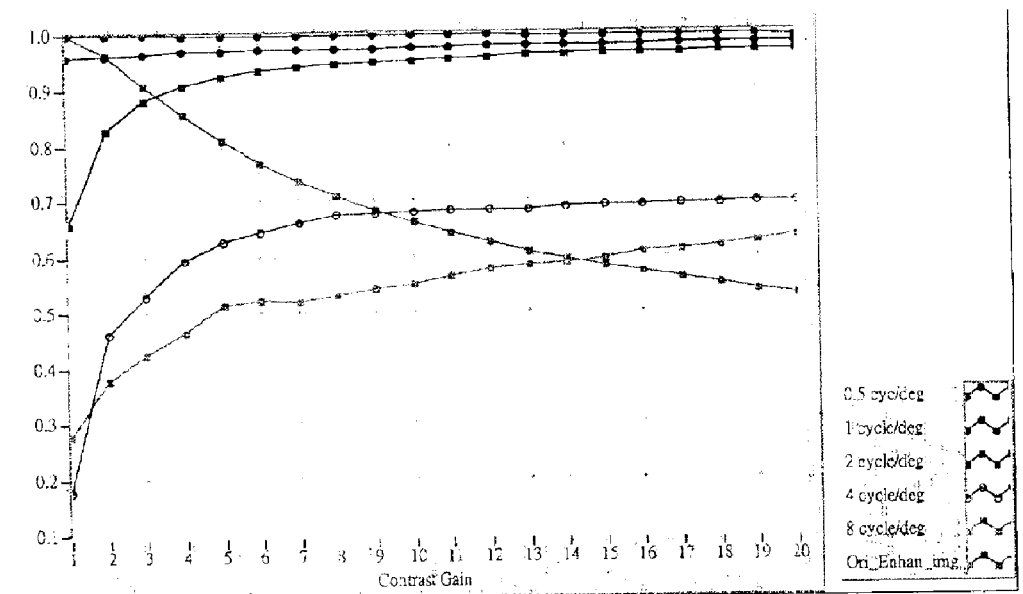
FIG. 12 is the correlation coefficient chart between the simulated image seen by the patient and the intensified one under various image contrast parameters.
Figure 13:
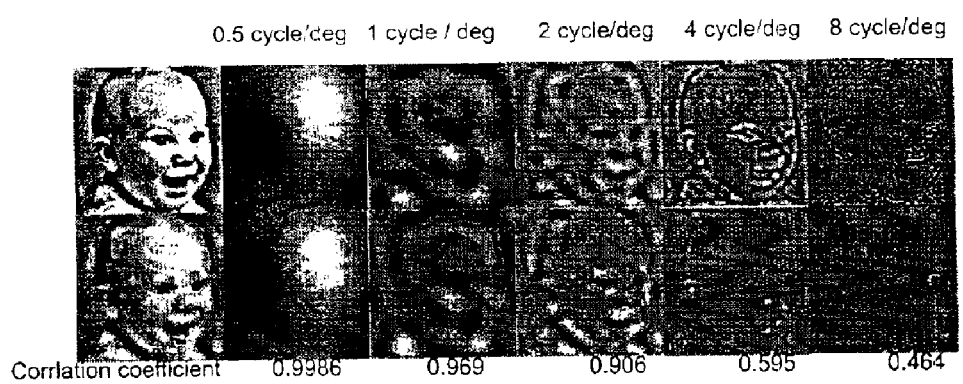
FIG. 13, the upper row images are the intensified images, and the lower row images are the simulated intensified image seen by the patient, and the most up-left image is the contrast intensified one, and from which toward right side are sequentially the image filtered by the passband filter with central frequency of 0.5 cycle/deg, 1 cycle/deg, 2 cycle/deg, 4 cycle/deg and 8 cycle/deg, and the correlation coefficient between the upper and lower raw images done individually under various space frequency.

As shown as FIG. 12, while the contrast gain increasing, the correlation coefficient between the simulated image seen by the patient and the input image of the same frequency increases obviously. When the contrast gain is over 4, the increasing rate curve of the correlation coefficient becomes smoothly. The red dotted line expresses the correlation coefficient between the original image and the intensified image. When the contrast gain is increasing (the image contrast intensification effect is more intense), the correlation coefficient between both will reduce gradually, so the excessive intensification will make the difference between image information and original image too great, resulting in the originally slight image information in the image become high contrast image.

As shown as the same FIG. 12, by considering the correlation coefficient between the original image and the contrast intensified image, the image contrast intensification coefficient (contrast gain) can be set as 4. Thus, it will provide the proper image intensification parameter for the patent, and allow obtaining optimum image effect. It also gives consideration to the similar degree between the intensified image and the original image.

Figure 4:
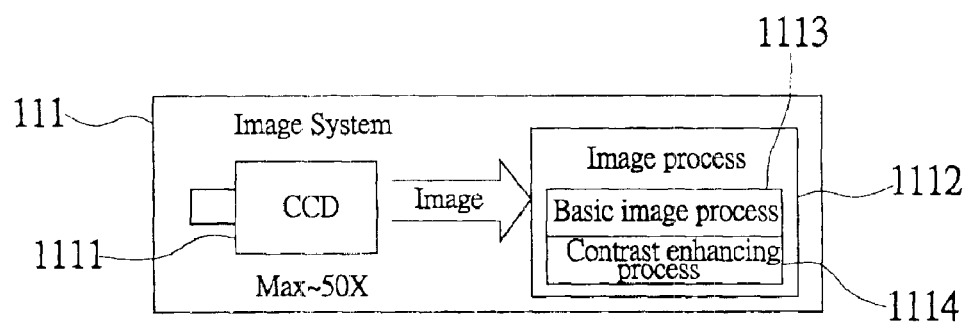
FIG. 4 is the image system flow chart of the electronic magnification system.
Figure 14:
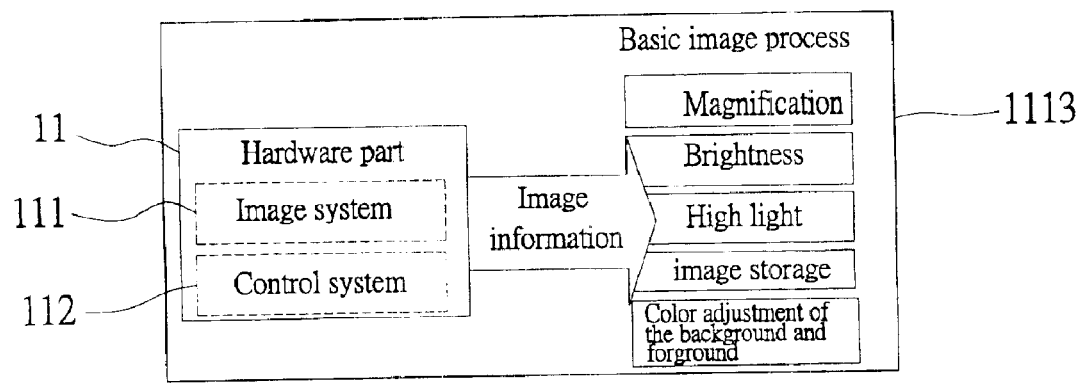
FIG. 14 is the image processing flow chart.

Besides, the image system processing center 1112 of the hardware part 11 can provide the basic image processing 1113 and intensification processing 1114, shown as FIG. 4:

The said basic image processing 1113: receives digital image information from the hardware part 11 and makes image processing immediately, such as magnification, brightness, high light, image storage and color adjustment of the background and foreground. The flow chart of the said basic image processing is shown in FIG. 14. Because the more intensive the contrast between the characters and the background is, the clearer image for the vision disabled. We provide with high light function for the characters and the background, and the vision disabled may be more sensitive for some specific color. Therefore, we add in the system the self-adjustable function for the color of the characters and the background, which allow the user for better reading quality. In addition to the primary magnification can be up to 60×, the back end image processing can also magnify the image for over 2~3×, resulting in the entire magnification of the system can be up to be over 120×.

Figure 15:
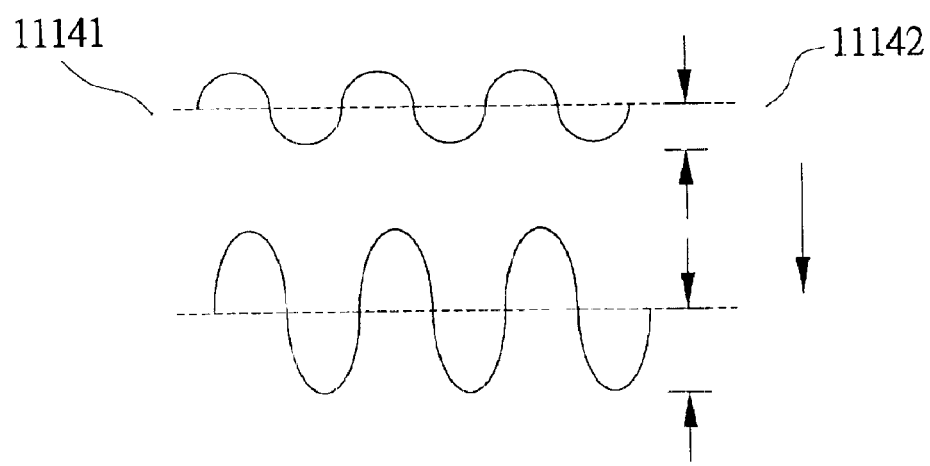
FIG. 15 is the relation diagram between the local luminance mean and the local contrast.
Figure 16:
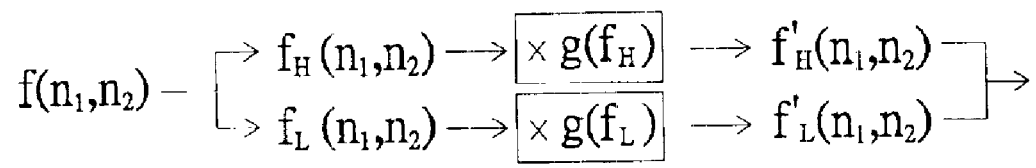
FIG. 16 is the illustrative diagram of the image contrast intensification.

The said image contrast intensification process 1114: after the optimum image contrast intensification parameter 1221 has been obtained from preset system 121, provide the parameter to the image contrast intensification process 1114 as contrast intensification of the image boundary, which uses adaptive filtering in image processing to intensify the contrast information of the image boundary. As shown as FIG. 15, the local luminance mean 11141 and the local contrast 11142 of the image can be used to achieve the image contrast information intensification. The local luminance mean component $f_L(n_1,n_2)$ and the local contrast component $f_H(n_1,n_2)$ can be calculated from the image $f(n_1,n_2)$ by using the low-pass Gaussian filter. And then these components can be multiplied by intensification parameter with different ratio $g(f_L)$, $g(f_H)$ to get the corrected local luminance mean 11141 $f'_L(n_1,n_2)$ and the corrected local contrast component 11142 $f'_H(n_1,n_2)$. Finally, the sum of the corrected local luminance mean 11141 and the corrected local contrast component 11142 is used to get the image which is done by image contrast intensifying. The flow chart of which is shown as FIG. 16.

Figure 17:
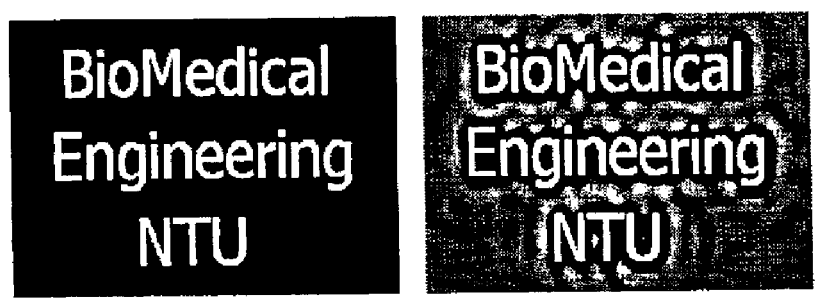
FIG. 17 is the diagram of the original characters and the enhanced characters.
Figure 18:
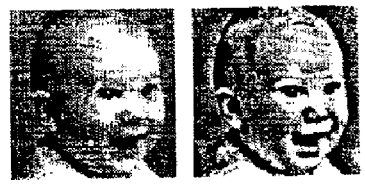
FIG. 18 is the un-processed graph and the graph after image contrast intensification thereof.

We can use image contrast intensification method for intensifying the boundary contrast intensification of the image of the characters and pictures, allowing the vision disabled to identify the characters and pictures image more easily (FIG. 17, FIG. 18).

Figure 19:
FIG. 19 is the un-processed image seen by the retinitis pigmentosa patient, and the image seen after contrast intensification thereof.
Figure 20:
FIG. 20 is the un-processed image seen by the macular degeneration patient, and the image seen after contrast enhancement thereof.

Take the image information as input image, which is the image after image contrast intensifying according to the simulated cataract and macular degeneration patient with linear simulation and non-linear simulation in the preset system 121 (FIG. 19, FIG. 20) FIG. 19 and 20 show that the image quality, which is after image contrast intensification processing, is superior for the vision disabled, and the image identification degree can be increased for the vision disabled. Besides the preset system 121 can previously provide with the image contrast intensification parameter 1221, the vision disabled can adjust the contrast intensification condition properly according to the vision identification degree thereof to achieve the optimum identification effect. As for the aspect of image processing 111, we provide with the function of basic image processing 1113 and image contrast intensification 1114.

Figure 21:
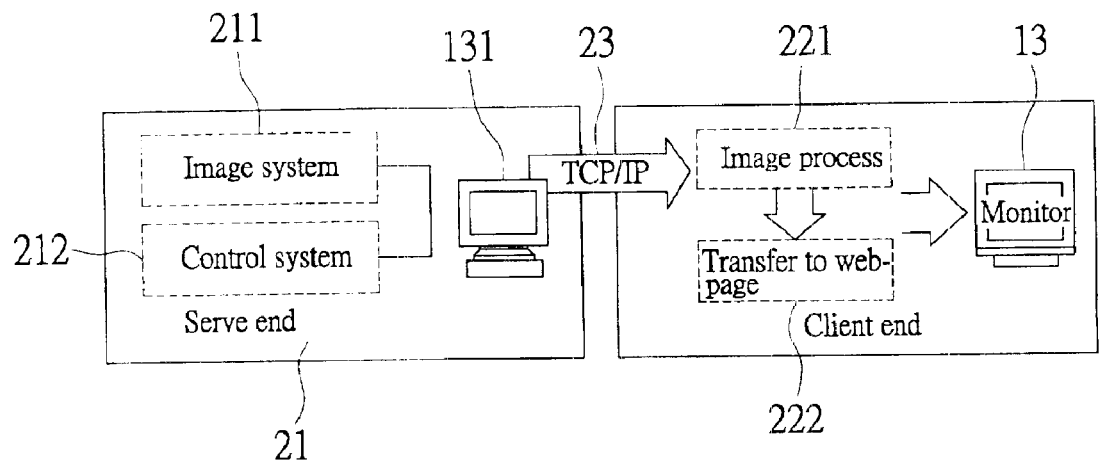
FIG. 21 is the internet instruction system structure diagram of the invention.
Figure 22:
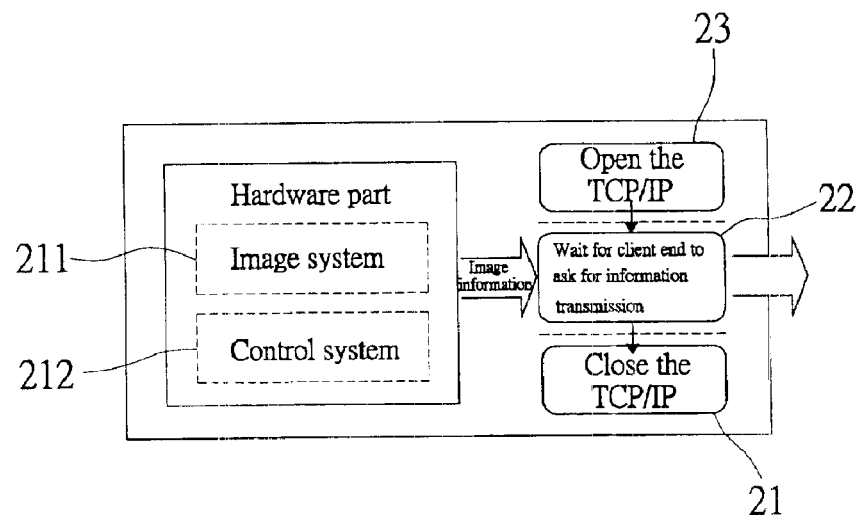
FIG. 22 is the server end system structure diagram of the internet instruction system.

Thus, in the electronic magnification system 1 structure, the completed hardware part 11 and software part 12 of the electronic magnification system 1 can instantly acquire the image and match with the reading platform 1121 to make programmable control. The resulted image through the image contrast intensification 1114 function allows the vision disabled can read and identify the image more easily. Furthermore, the matched preset system 121 can be used to quantify the vision degradation degree 1211 of the patient. Consequently, the electronic magnification system 1 not only provide with quite level in function and system completeness, but also integrate the electronic magnification system 1 to be applied in the internet instruction 2, or simplify the system to be combined with portable aid 3. The technical characteristics of which will be described below:

(1) Internet Instruction Reading System 2:

Internet instruction reading system 2 combines the present electronic magnification system 1 with TCP/IP transmission function, and is applied in the class instruction reading for the vision disabled. The structure thereof can be divided into server end 21 and client end 22. The server end 21 mainly digitalizes the external image, and transmits the image information immediately to the client end 22. The functions of the client end 22 are to convert the obtained information back to image information and provide with image processing and magnification. While the teacher is teaching in the class, if a system can be provided to catch the teaching materials and characters on the blackboard into image and digitalize, and allow the image to be transmitted to multi-user system at one time, and the client end 22 can allow each users to adjust the image processing parameter required for the user. Thus, the vision disabled can clearly understand and identify the image information. The major internet instruction reading system 2 which is planned for the vision disabled can be divided into two parts of server end 21 and client end 22. The system structure is described as FIG. 21:

The major function of the said server end 21 system is to acquire image by the image system 211, and use control system 212 to adjust the X-Y axis position of the reading platform (PC) 131. After the image acquired, the server end 21 system will store the digitalized image in the memory, open the TCP/IP 23, and wait until the client end 22 ask for information transmission. The flow chart of which is shown as FIG. 22.

Figure 23:
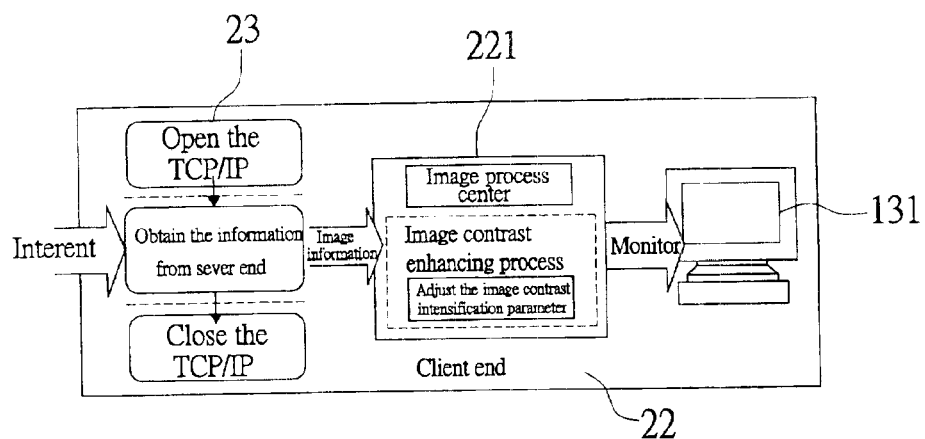
FIG. 23 is the client end system structure diagram of the internet instruction system.

The said client end 22, after opening the TCP/IP 23, the information can be obtained from server end 21 via the TCP/IP 23 (FIG. 23). Though the functions of the image processing 221 in the client end 22 and the image processing 211 in the server end 21 are the same, both are individually set. After processing the image in the client end 22, the image thereof will not influence the image information in the server end 21. Thus, the image information in the server end 21 can be transmitted to different client end 22 systems in one time, and the image processing parameter can be operated by each client end 22 system user. Consequently, the image processing 221 functions of the client end 22 are to provide with basic image processing, such as contrast, brightness, saturation and contrast intensification processing.

Utilizing the concept of internet information transmission, the image information from server end 21 system can be transmitted to client end 22 system through TCP/IP 23. In the client end 22 system, the image information of the server end 21 can be accessed by multi-user in one time, and the image processing 221 and appearance can be made in each client end 22 system. The structure of the client end 22 system is added with the image contrast intensification function of the server end 21 system to allow the vision disabled to adjust the image contrast intensification parameter according to one's own vision, which makes the patient obtain the optimum image quality. We adapt the client end 22 system program for merely using explorer to proceed image exploring, allowing there needs no additional program setup for the computer 131 of the client end 22 system, and if only the computer 131 provides with explorer, the real time view and image intensification parameter adjustment suitable for one's own can be achieved, speeding the popularity of the internet instruction reading system 2 and increasing the convenience in use.

Figure 24:
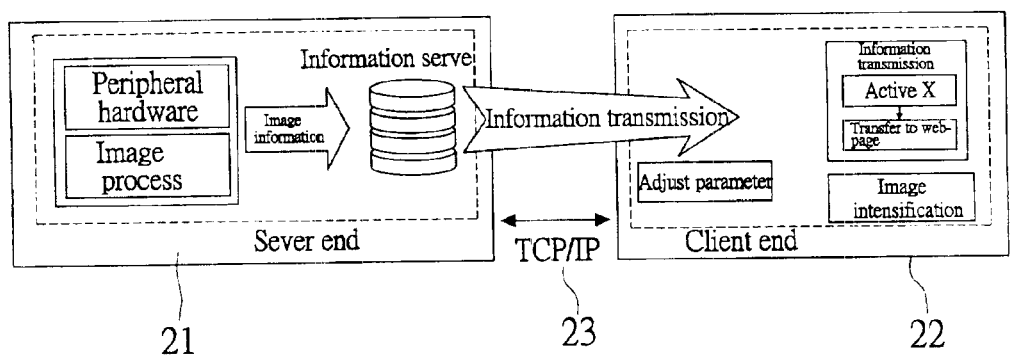
FIG. 24 is the network structure diagram between the client end and the server end of the internet instruction system.

The server end 21 system predetermines a memory space for the information storage of the accessed image information, and the TCP/IP 23 is open to wait for the opening of the TCP/IP 23 of the client end 22 system. After the connection between both TCP/IP 23 is achieved, both information can be transmitted mutually. The network structure diagram between the server end 21 system and the client end 22 system is shown as FIG. 24.

Figure 25:
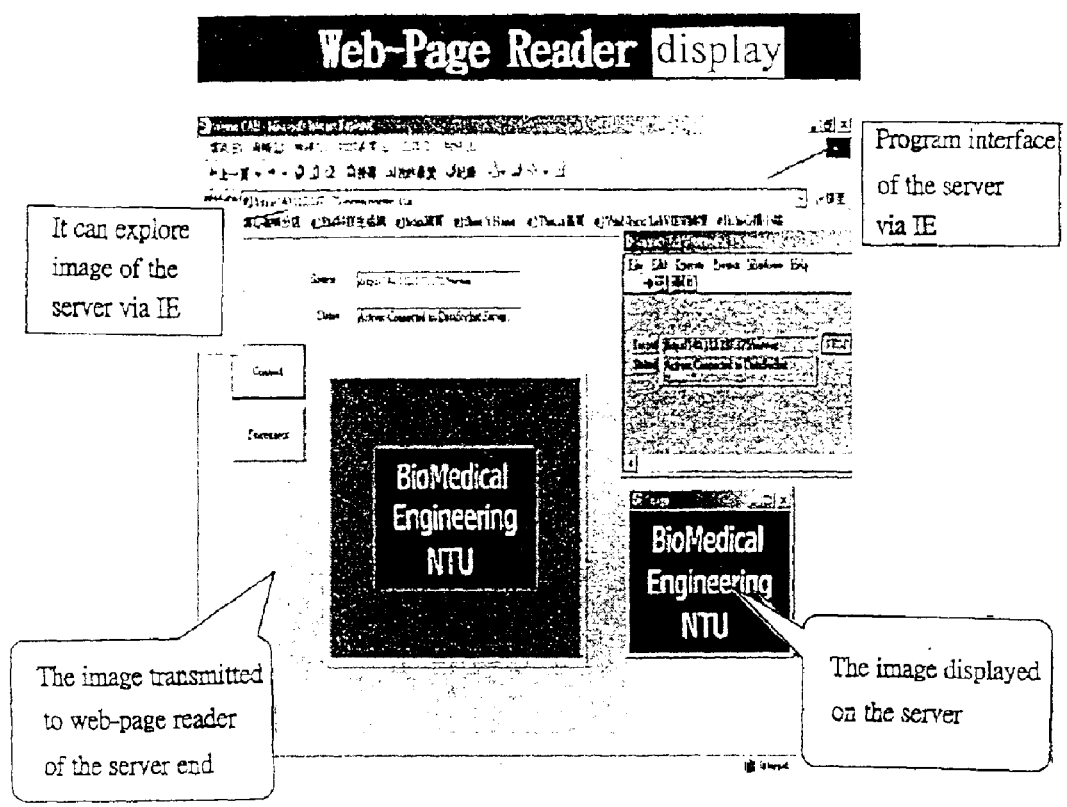
FIG. 25 is the image information delivery reveal diagram between the client end and the server end of the internet instruction system.

After the client end 22 system accessing the image information, the vision disabled can adjust the image contrast intensification parameter in the client end 22 program following the requirement for the vision to make optimum image effect. In current networklized century, the cross-platform function which is between the network information is extremely important. The weblization of the client end 22 system program exactly can solve the platform problem of the program, whether the operation system (NT or UNIX) of the client end 22 system is compatible with the client end 22 system program or not is not necessary to be considered. The client end 22 merely needs the explorer to view the weblized image content. The system structure is shown as FIG. 24, using the active X to connect with the TCP/IP 23 of the server end, the client end 22 system can access the image information of the server end 21 system. FIG. 25 is the image information delivery drawing of the actual server end 21 system and the client end 22 system.

The networklization of the client end 22 system program will bring the reading system into unprecedented convenience. There is no need for additionally setup of the program software, through the explorer, the image information of the server end 21 can be accessed and the vision disabled can adjust the image and contrast intensification according to one's own vision degree. The network of the client end 22 system program will allow the internet network reading system 2 to be popular in high speed.

(2) Portable Electronic Aided Reading System 3:

After completing the desktop electronic magnification system 1, and applying which in the internet instruction reading system 2 in sequence, the image effect required for the vision disabled, i.e. the function of image contrast enhanced processing is implanted into the portable electronic aid system 3, allowing the vision disabled can use in reading more conveniently.

Figure 26:
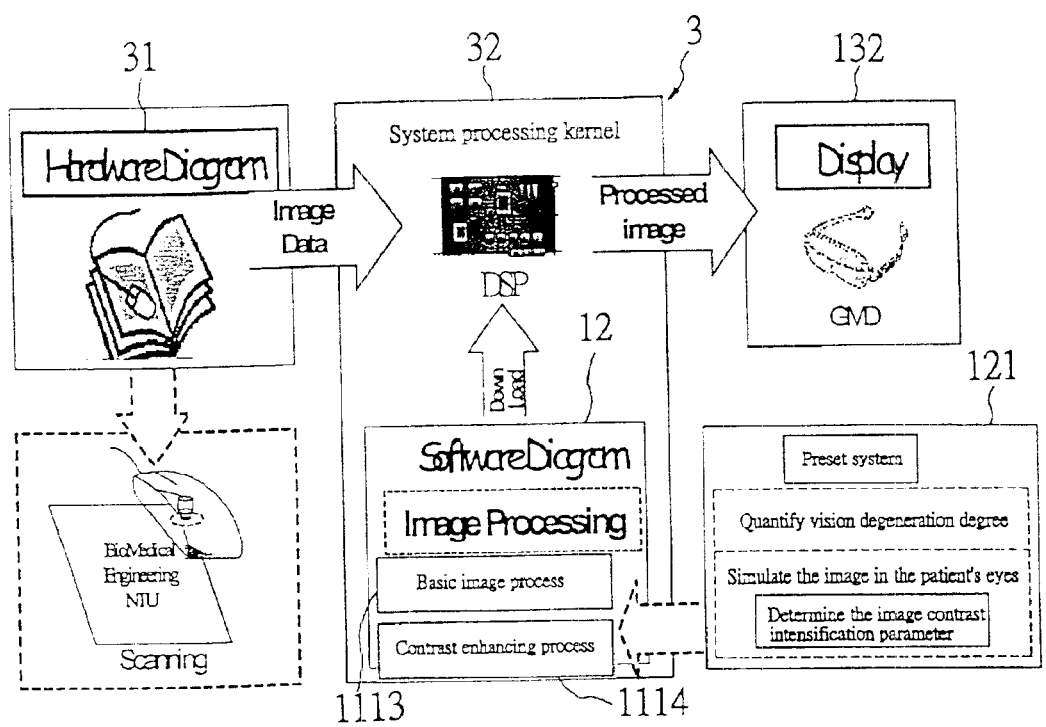
FIG. 26 is the portable computer aid reading system structure diagram.

The structure of the portable electronic aid system 3 is shown as FIG. 26, the hardware part of the front end image acquisition changes the desktop reading platform 1121 into hand scanning system 31, and after using the analog-digital converter to convert the image information accessed by the hand scanning system into digital signal, transmits which to digital signal processor for operation, then after converting the digital signal into analog one, the image after image enhancement is output to the connected goggle mounted display 132. In the portable system 3, the focus is on the program writing for the DSP center, and write the software part 12 in the electronic magnification system 1 into program code of the DSP system, and then loads which into DSP 32 to meet the requirement for the portable electronic aid reading 3 system. Through above-mentioned system integration, the various characteristics and effects provided is as follows:

1, Electronic Magnification System Structure:

The electronic magnification system structure is divided into two parts of hardware and software for introduction. The hardware part mainly can control reading platform and receive external image instantly, and transfer the image information to the software part for image processing to make proper image enhancement, resulting in the image information which makes the vision disabled and the aged read books and identify more easily.

Hardware Part

Figure 27:
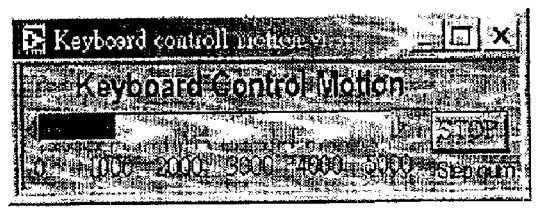
FIG. 27 is the control interface diagram of the reading platform.
Figure 28:
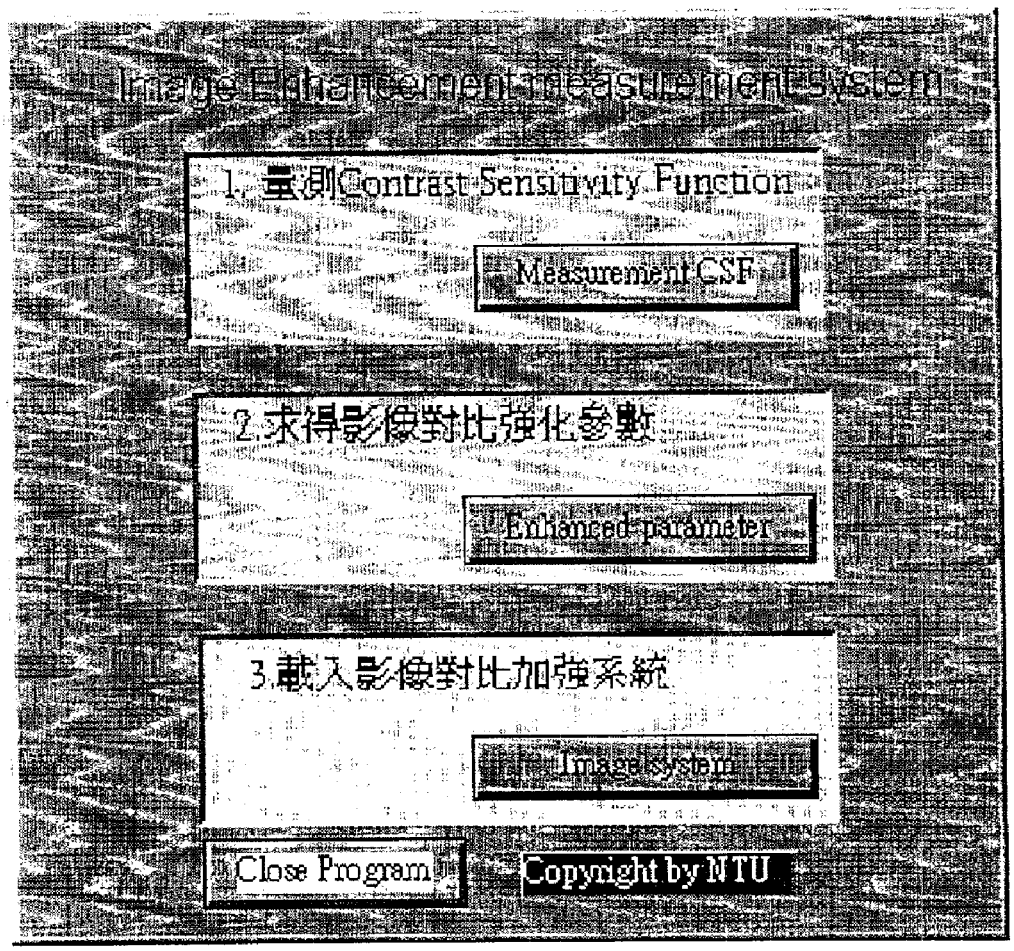
FIG. 28 is the integrated interface diagram of the preset system.

The hardware part consists of image system and control system. It also connects with PC, which can have programmable control and process functions. In the image system, through the high magnification lens and camera, the image magnification can be up to 60×. In the control system, the movement of the reading platform can be programmable, and the operation application can be achieved by using the direction key on the keyboard, FIG. 27 is the control interface diagram.

Software Part

In the software part, we hope to be able to make proper image processing according to the vision degradation degree and intensify image contrast information in advance, resulting that the patient can read books and identify the pictures in the books more easily.

Therefore, the software part is divided into two units of preset system and image processing center, the preset system mainly quantifies the patient's vision degradation degree previously, and determines the image contrast intensification parameter via the simulated image in patient's eyes. Then the contrast intensification parameter is implanted into the image process center, such that the image acquired by the hardware part can immediately be through image contrast intensification process by the image processing kernel to enhance the contrast intensity of the boundary part of the image.

Preset System

In the preset system, we integrate the function of measurement for the patient's vision degradation degree and the simulated image seen by the patient. Therefore, the image contrast intensification parameter can be determined to provide the image contrast intensification which is most suitable for the patient.

Figure 29:
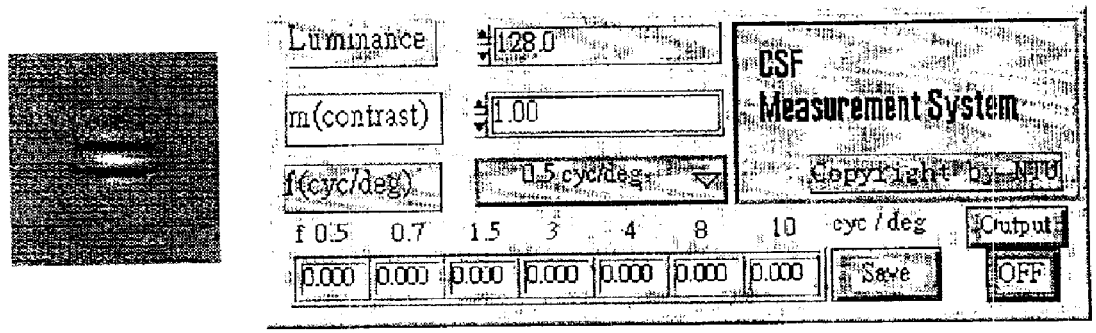
FIG. 29 is the measurement contrast sensitivity function system interface diagram.

To quantify the patient's vision degradation degree, we use sine grating to measure the patient's CSF which is used to simulate the image seen by the retinitis pigmentosa patient and the macular degeneration patient individually by linear and non-linear simulation method. Thereby, the image contrast intensification parameters can be determined for image contrast intensification which intensifies the contrast of the image boundary. And then, it can allow the patient to obtain optimum vision effect under present vision condition. The measurement CSF system interface is shown as FIG. 29.

Figure 30:
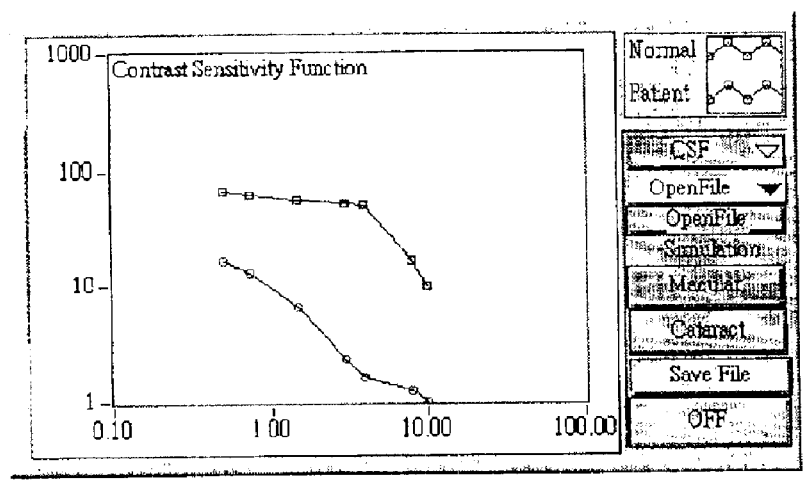
FIG. 30 is the measurement contrast sensitivity function system interface diagram; the right side can simulate instantly the image seen by the macular degeneration and retinitis pigmentosa patient.
Figure 31:
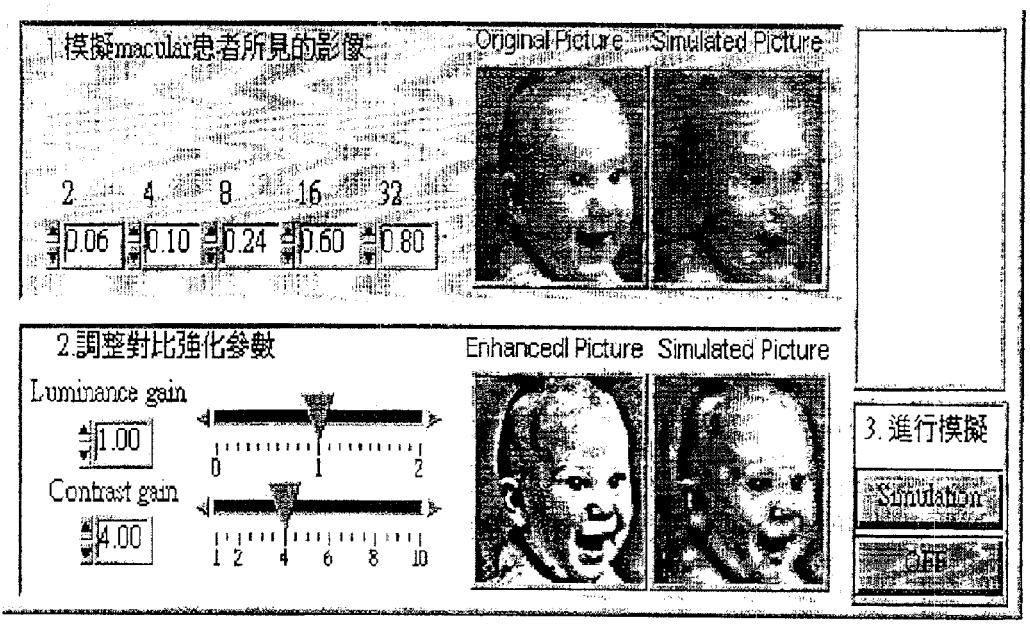
FIG. 31 is the simulated image interface diagram seen by the macular degeneration patient.
Figure 32:
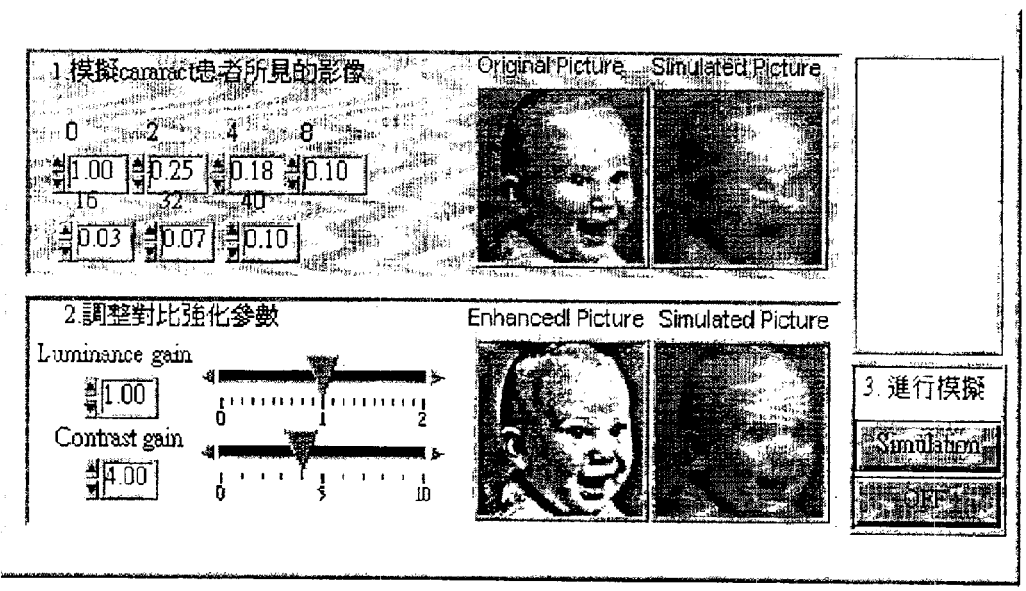
FIG. 32 is the simulated image interface diagram seen by the retinitis pigmentosa patient.
Figure 33:
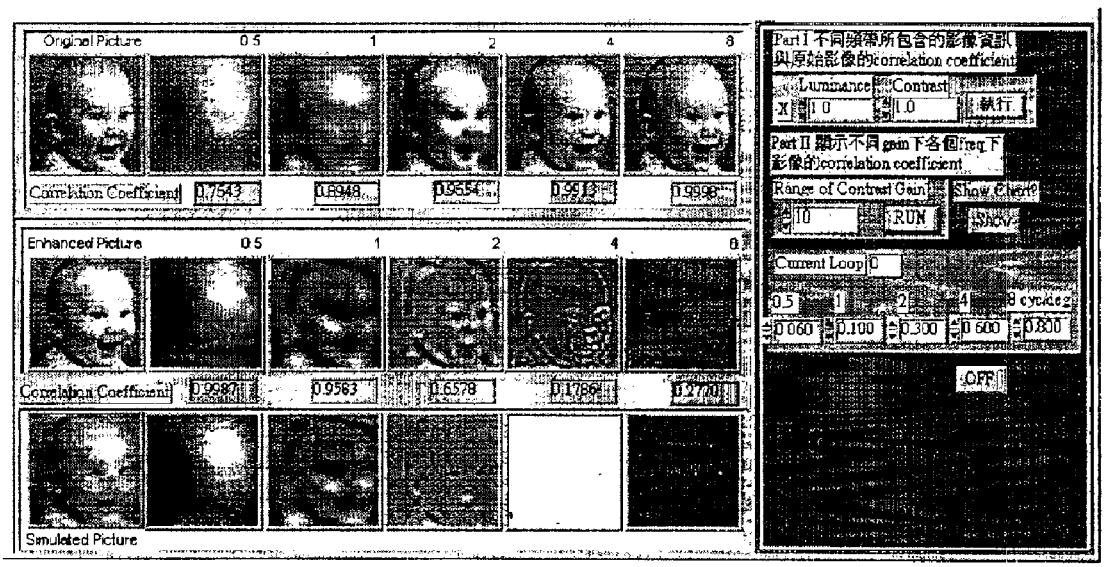
FIG. 33 is the quantified image contrast enhancement parameter interface diagram 1.
Figure 34:
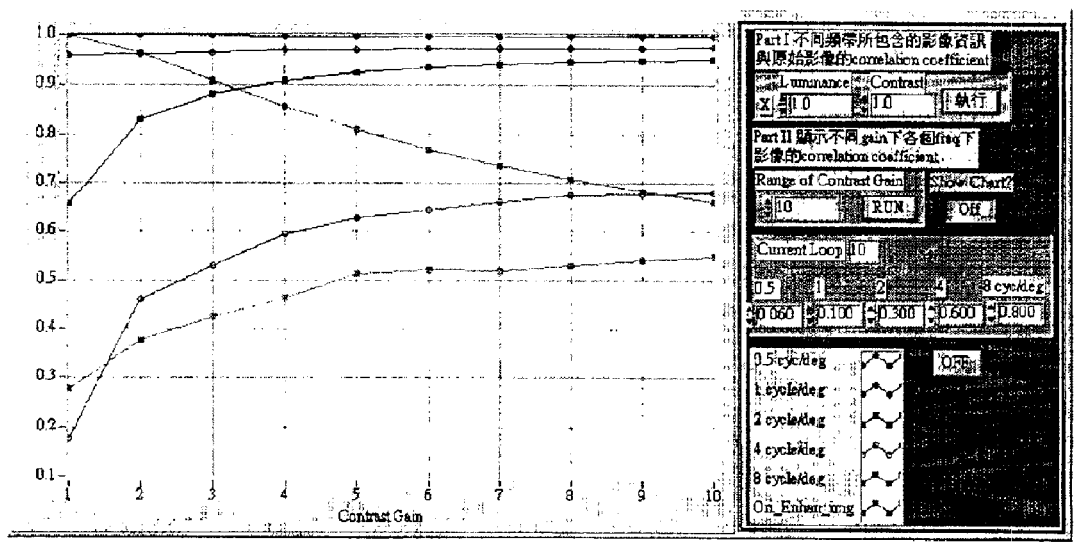
FIG. 34 is the quantified image contrast enhancement parameter interface diagram 2.

The measured patient's CSF can be transferred into chart and the quantification curve can be drawn instantly (FIG. 30). The measured CSF can be used in the simulation system instantly to simulate the image seen by the retinitis pigmentosa patient and the macular degeneration patient. The image contrast intensification parameter can be adjusted, after image enhancing and then through the simulated image seen by the patient to know the image enhancement with regard to the obtained image information for the patient (FIG. 31, FIG. 32). We also provide the interface program for determining the image contrast intensification parameter. It can indicate more information for the patient in determining the image contrast intensification parameter. In FIG. 33, the interface of quantifying image contrast intensification parameter provides the correlation coefficient between the enhanced image and the image actually seen by the patient after adjusting with various image contrast intensification parameter (contrast gain). And the quantification chart (FIG. 34) of the correlation coefficient between the enhanced image and the image actually seen by the patient under the condition that the contrast gain can be from 11~0 or determined by the user. As well the correlation coefficient between the original image and the enhanced image with various contrast gain (the greater the contrast gain is, the similarity between the original image and the enhanced image is worse) is the indication for determining the image contrast intensification parameter (contrast gain).

Image Processing Center

Therefore, in the image processing kernel, the two parts of image processing unit of basic image processing and image contrast intensification processing are provided.

Basic Image Processing

In the aspect of basic image processing, the digital image information received from the hardware part is immediately image processed, such as magnification, brightness, high light, image storage, and color adjustment of the background and foreground. Because the more intensive the contrast between the characters and the background is, the clearer the image for the vision disabled, we provide with high light function for the characters and the background, and the vision disabled may be more sensitive for some specific color. Therefore, we add in the system the self-adjustable function for the color of the characters and the background, which allow the user for better reading quality.

Image Contrast Intensification Processing

After the optimum image contrast intensification parameter is calculated by the preset system, providing the parameter can be provided to image contrast intensification processing for making image boundary contrast intensification. In the image boundary contrast intensification processing, we use adaptive filtering in image processing to intensify the contrast information of the image boundary. We use individually the image contrast intensification method to intensify the boundary contrast intensification of the characters and pictures. It allows the vision disabled to identify the characters and pictures information more easily. The results after enhancing are show as FIGS. 17, 18, 19, 20. From FIGS. 19, 20, we can understand that the image quality is superior for the vision disabled after the image contrast intensification processing, and the image identification degree can be increased for the vision disabled. Besides the preset system can previously provide with the image contrast intensification parameter, the vision disabled can adjust the contrast intensification condition properly according to the vision identification degree thereof to achieve the optimum identification effect.

2. Internet Instruction Reading System:

Internet instruction reading system combines the present electronic magnification system with TCP/IP transmission function, and is applied in the class instruction reading for the vision disabled. The structure thereof can be divided into server end and client end. The server end mainly digitalizes external image, and transmits the image information immediately to the client end. The function of the client end is to convert the obtained information back to image information and to provide with image processing and magnification. If a system can be provided to acquire the image of the teaching materials and characters on the blackboard and to transmit the digitalized image to multi-user system at one time, the client end can allow each users to adjust the image processing parameter which is required for the individual user. Hence, the vision disabled can clearly understand and identify the image information when the teacher is teaching in the class.

Weblization

Adapting the client end system program for merely using explorer to proceed image exploring, allowing there needs no additional program setup for the computer of the client end system, and if only the computer provides with explorer, the real time view and image intensification parameter adjustment suitable for one's own can be achieved, speeding the popularity of the internet instruction reading system and increasing the convenience in use. In current networklized century, the cross-platform between the network information is extremely important. The weblization of the client end system program exactly can solve the platform problem of the program. Whether the operation system (NT or UNIX) of the client end system is compatible with the client end system program or not is not necessary to be considered, the client end merely needs the explorer to view the weblized image s content. The system structure is shown as FIG. 24, wherein after using the active X and the TCP/IP of the server end is connected and the image information of the server end system is accessed, then which is shown in the client end system. FIG. 25 is the image information delivery drawing of the actual server end system and the client end system.

The networklization of the client end system program will bring the reading system into unprecedented convenience. There is no need for additionally setup of the program software, the image information of the server end can be accessed through the explorer. The vision disabled can adjust the image and contrast intensification according to one's own vision degree in client end. Furthermore, the network of the client end system program will allow the internet network reading system to be popular in high speed.

3. Portable Electronic Aid Reading System

Aiming at the image effect required for the vision disabled—image contrast intensification processing function, building in the function into the portable electronic aid system, allowing the vision disabled to read more easily. The system structure thereof is shown as FIG. 26. In the structure of the portable electronic aid system, the desktop reading platform into hand scanning system is used to instead of the hardware part of the front end image acquisition. After using the analog-digital converter, the image information which is acquired by the hand scanning system can be converter into digital signal. It also transmits to digital signal processor for operation, and then after converting the digital signal into analog one, the enhenced image is output to the connected goggle mounted display. In the portable system, the focus is on the program writing for the DSP center, writing the software part in the electronic magnification system into program code of the DSP system, loading which into DSP to meet the requirement for the portable electronic aid reading system. Such that use of the invention and design thereof, through the electronic aid reading system, it allows the vision disabled to adjust the image contrast intensification parameter based on the vision degradation degree thereof to intensify the contrast information of the image, and provides optimum image effect, with the internet function in add in the electronic aid reading system, it makes which become the class instruction reading system for the vision disabled, the DSP processor with exclusive image contrast intensification function can be provided to consider for outdoors, while increase the convenience of the electronic magnification system, which bring more convenience and practicability for the vision disabled.

Summarizing above description, the present invention provides with digital amblyopia image aid system with individually adjustable function, which uses great invention of technical idea of natural law more innovative then conventional optical aids and electronic magnifier and also increases in essential effect, which is completely fitted with the statutory condition, thereby filed the patent application in conformity with the law.

What is claimed is:

1. A digital amblyopia image aid system provided with individually adjustable function comprises at least:
   an image input apparatus, used to receive the external original image, and transmit thereof to image processing apparatus for processing;
   an image processing apparatus, mainly used to quantify the patient's vision degeneration degree first, and simulate the image in the patient's eyes, to determine the image contrast intensification parameter, then through the intensification parameter, instantly make image contrast intensification process for the basic image and the image boundary of the original image, thereby obtain the actual image suitable for the vision of individual patient; and
   an image output apparatus, used to display the practical image after enhancing process.

2. The digital amblyopia image aid system provided with individually adjustable function of claim 1, wherein the said image input apparatus consists of a preset system and an image processing kernel.

3. The digital amblyopia image aid system provided with individually adjustable function of claim 2, wherein the said preset system is responsible for quantifying the patient's vision degradation degree and simulating the image in the patient's eyes to determine the image contrast intensification parameter.

4. The digital amblyopia image aid system provided with individually adjustable function of claim 2, wherein the said preset system uses the correlation coefficient of mutual, combined operation to compare the image information before and after simulation under different frequency to determine the image contrast intensification parameter.

5. The digital amblyopia image aid system provided with individually adjustable function of claim 2, wherein the said preset system adjusts on the vision individually for amblyopia patient, which via linear and non-linear method to simulate the image seen by the vision disabled to determine the image contrast intensification parameter, and bases on the image enhancement effect required for the users to adjust the image contrast intensification parameter suitable for oneself to enhance the image contrast information and provide optimum image effect.

6. The digital amblyopia image aid system provided with individually adjustable function of claim 5, wherein the linear simulation method is used to simulate the image information that the retinitis pigmentosa patient can identify.

7. The digital amblyopia image aid system provided with individually adjustable function of claim 5, wherein the non-linear simulation method is used to simulate the image information that the macular degeneration patient can identify.

8. The digital amblyopia image aid system provided with individually adjustable function of claim 2, wherein the said image processing center comprises a basic image processing unit and an image contrast intensification processing unit.

9. The digital amblyopia image aid system provided with individually adjustable function of claim 8, wherein the said basic image processing unit is the reference intensification parameter, which adjusts the original image for magnification, brightness, highlight, image storage and the front and back ground color, etc.

10. The digital amblyopia image aid system provided with individually adjustable function of claim 8, wherein the said image contrast intensification processing unit enhances the image boundary using the intensification parameter as the base of image contrast intensification.

11. The digital amblyopia image aid system provided with individually adjustable function of claim 10, wherein the said image processing center uses the change for the local luminance mean and the local contrast of the image information, and then multiply which individually by the intensification parameter value of the preset operation, to achieve the image contrast intensification effect.

12. The digital amblyopia image aid system provided with individually adjustable function of claim 1, wherein the said image input apparatus is an electronic magnifier, by which the external image can be obtained instantly.

13. The digital amblyopia image aid system provided with individually adjustable function of claim 1, wherein the said image input apparatus is an internet server end, by which the external image can be obtained instantly.

14. The digital amblyopia image aid system provided with individually adjustable function of claim 1, wherein the said image input apparatus is a scanner, by which the external image can be obtained instantly.

15. The digital amblyopia image aid system provided with individually adjustable function of claim 14, wherein the said scanner is a hand-type micro camera.

16. The digital amblyopia image aid system provided with individually adjustable function of claim 15, wherein the said hand-type scanner uses digital signal processor (DSP) and reset the software part into DSP program in the electronic camera system to meet the system requirement.

17. The digital amblyopia image aid system provided with individually adjustable function of claim 14, wherein the said scanner is a desktop scanner.

18. The digital amblyopia image aid system provided with individually adjustable function of claim 1, wherein the said image output apparatus is a computer reading platform, which is used to display the image after processing.

19. The digital amblyopia image aid system provided with individually adjustable function of claim 1, wherein the said image output apparatus is equipped with control system, which changes the reading platform to adopt X-Y axis movable platform, which can be controlled to move by using the direction key control platform.

20. The digital amblyopia image aid system provided with individually adjustable function of claim 1, wherein the said image output apparatus is a goggle mounted display (GMD), which is used to display the image after processing.

21. The digital amblyopia image aid system provided with individually adjustable function of claim 1, wherein through converting the communication protocol client end into weblization, there in no need for additional setup program, the client end can use explorer to obtain the image information of the server end, and the image enhancement process can made according to the image contrast intensification parameter required for individual person, thereby the inconvenience of program setup thereof can be simplified, and the internet instruction reading effect with cross-platform can be achieved.

* * * * *